United States Patent [19]

Saito

[11] Patent Number: 5,526,174
[45] Date of Patent: Jun. 11, 1996

[54] OPTICAL AMPLIFICATION SYSTEM

[75] Inventor: Tomoki Saito, Tokyo, Japan

[73] Assignee: NEC Corporation, Tokyo, Japan

[21] Appl. No.: 158,566

[22] Filed: Nov. 29, 1993

[30] Foreign Application Priority Data

Nov. 27, 1992 [JP] Japan .................................. 4-318708

[51] Int. Cl.$^6$ ............................................. H01S 3/00
[52] U.S. Cl. ........................................ 359/337; 359/341
[58] Field of Search ................................ 359/333, 337, 359/341, 156

[56] References Cited

U.S. PATENT DOCUMENTS

| | | | |
|---|---|---|---|
| 4,923,291 | 5/1990 | Edagawa et al. | 350/389 |
| 4,941,738 | 7/1990 | Olsson | 350/377 |
| 5,138,621 | 8/1992 | Goto et al. | 372/6 X |
| 5,210,808 | 5/1993 | Grasso et al. | 359/156 X |
| 5,223,705 | 6/1993 | Aspell et al. | 372/6 X |
| 5,231,529 | 7/1993 | Kaede | 359/124 |
| 5,276,549 | 1/1994 | Tagawa et al. | 359/341 |
| 5,283,686 | 2/1994 | Huber | 359/341 X |
| 5,303,314 | 4/1994 | Duling, III et al. | 359/341 X |
| 5,323,260 | 6/1994 | Alfano et al. | 359/341 X |

OTHER PUBLICATIONS

Tomoki Saito et al., "High Receiver Sensitivity . . . Preamplifier Pumped with a 0.98 μm Laser Diode", IEEE Photonics Technology Letters, vol. 3, No. 6, Jun. 1991, pp. 551–553.

H. Shimizu et al., "Highly Practical Fiber Squeezer Polarization Controller", Journal of Lightwave Technology, vol. 9, No. 10, Oct. 1991, pp. 1217–1224.

Journal of Lightwave Technology, vol. 7, No. 4, Apr., 1989, pp. 651–656, C. R. Giles et al., "2-Gbit/s signal amplification at lambda=1.53 um in an Erbium-doped single-mode fiber amplifier".

Journal of Lightwave Technology, vol. 9, No. 10, Oct. 1991, pp. 1217–1224, H. Shimizu et al, "Highly practical fiber squeezer polarization controller".

Patent Abstracts of Japan, vol. 13, No. 543, 6 Dec. 1989.

Institute of Electronics, Information and Communicatin Engineers of Japan Papers B-I, vol. J75-B-I, No. 5, pp. 288–297.

*Primary Examiner*—Mark Hellner
*Attorney, Agent, or Firm*—Sughrue, Mion, Zinn, Macpeak & Seas

[57] ABSTRACT

In an optical amplification system of the present invention, an ASE (amplified spontaneous emission) light included in a signal light band is removed to provide low noise characteristics. The signal light is amplified by an optical amplification unit, and is supplied to an ASE removal unit. In the ASE unit, the signal light is transmitted therethrough, and the ASE light is reflected in the orthogonal direction to the light propagation direction. Consequently, the optical amplification system having low noise characteristics is obtained.

12 Claims, 6 Drawing Sheets

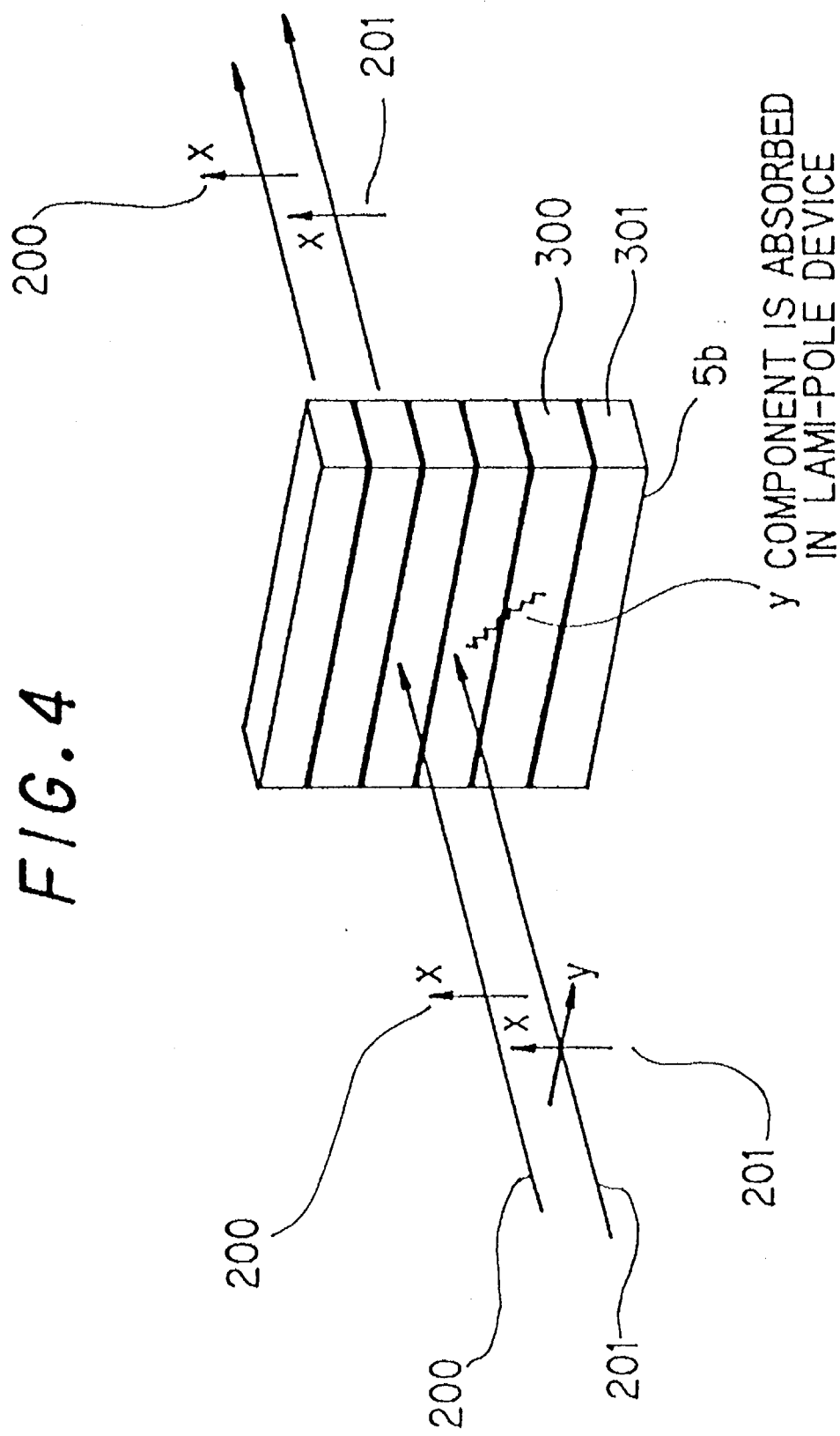

OPTICAL AMPLIFICATION SYSTEM

FIELD OF THE INVENTION

This invention relates to an optical amplification system, and more particularly, to an optical amplification system having low noise characteristics.

BACKGROUND OF THE INVENTION

A first conventional optical amplification system comprises a pump light source for emitting a pump light having a wavelength of, for instance, 0.98 µm, an optical coupler for coupling a signal light having a wavelength of, for instance, 1.55 µm and the pump light to provide a coupled light, and an Er(erbium)-doped optical fiber for amplifying the signal light, as described on pages 551 to 553 of "IEEE PHOTONICS TECHNOLOGY LETTER, VOL. 3, No. 6, June, 1991".

In the Er-doped optical fiber, the signal light included in the coupled light is amplified in accordance with the pumping with the pump light. Thus, the amplified signal light is obtained therein to be supplied to a following stage.

However, an amplified spontaneous emission (ASE) light having arbitrary polarizations is also generated in the Er-doped optical fiber, so that the ASE light will be noise at the following stage. Further, a ASE light beat noise generated among wavelengths of the ASE light $N_{ASE\ ASE}$ is added to the output light of the Er-doped optical fiber. The ASE light beat noise $N_{ASE\ ASE}$ is defined by the equation.

$$N_{ASE\ ASE} = m_t(G-1)^2 \cdot n_{sp}^2 \cdot \Delta\upsilon \qquad (1)$$

where $m_t$ is a transverse mode degree, $G$ is an amplification gain of the Er-doped optical fiber, $n_{sp}$ is a population distribution parameter of an amplification medium, and $\Delta\upsilon$ is the ASE light bandwidth. Therefore, the ASE light is suppressed by controlling the population distribution parameter of Er atoms to be, for instance, 1. Consequently, low noise amplification is realized in the first conventional optical amplification system.

A second conventional optical amplification system comprises a pump light source, an optical coupler, an Er-doped optical fiber, and an optical filter which is connected to an output of the Er-doped optical fiber as described in pages 288 to 297 of "INSTITUTE OF ELECTRONICS, INFORMATION AND COMMUNICATION ENGINEERS OF JAPAN PAPERS B-I, VOL. J75-B-I, No. 5".

In the optical filter, ASE lights generated in the Er-doped fiber having wavelengths equal and proximate a wavelength of a signal light pass, while ASE lights having other wavelengths are removed therein. Consequently, a low noise amplification system is realized in the second conventional optical amplification system. The similar systems are described in Japanese Kokai No. 1-298785, No. 1-127886 and No. 1-152819.

In the first conventional optical amplification system, however, there is a disadvantage in that ASE lights inside the signal light band can not be reduced, because a band-pass optical filter is used.

Further, the second conventional optical amplification system has a disadvantage in that the transverse mode degree $m_t$ of the ASE light is equivalently to be 2 to result in the generation of beat noise which is surplus by times of the transverse mode degree $m_t$, because polarizations of the ASE light generated in the Er-doped optical fiber are random.

SUMMARY OF THE INVENTION

Accordingly, it is an object of the invention to provide an optical amplification system having a low noise characteristic, in which an amplified spontaneous emission (ASE) light having an arbitrary polarization can be removed from the amplified light.

It is a further object of the invention to provide an optical amplification system having low noise characteristics, in which ASE lights inside a signal light band are removed.

It is a further object of the invention to provide an optical amplification system, in which a signal light having an arbitrary polarization is passed through an ASE removal unit.

It is a still further object of the invention to provide an optical amplification system, in which a polarization of a signal light is controlled in an ASE removal unit.

According to the invention, an optical amplification system, comprises:

an optical amplification unit comprising a pump light source for emitting a pump light, a wavelength division multiplexing coupler for coupling a supplied signal light and the pump light to provide a coupled light, an erbium-doped optical fiber for amplifying the signal light by absorbing the pump light to provide an amplified signal light and the signal light being of a predetermined polarization; and an amplified spontaneous emission light removal unit comprising means for removing an amplified spontaneous emission light being of other polarizations than the predetermined polarization.

BRIEF DESCRIPTION OF THE DRAWINGS

FIG. 4 is a schematic perspective view showing a further removing device included in the optical amplification system of the first preferred embodiment according to the invention;

DESCRIPTION OF THE PREFERRED EMBODIMENTS

Figure 1:
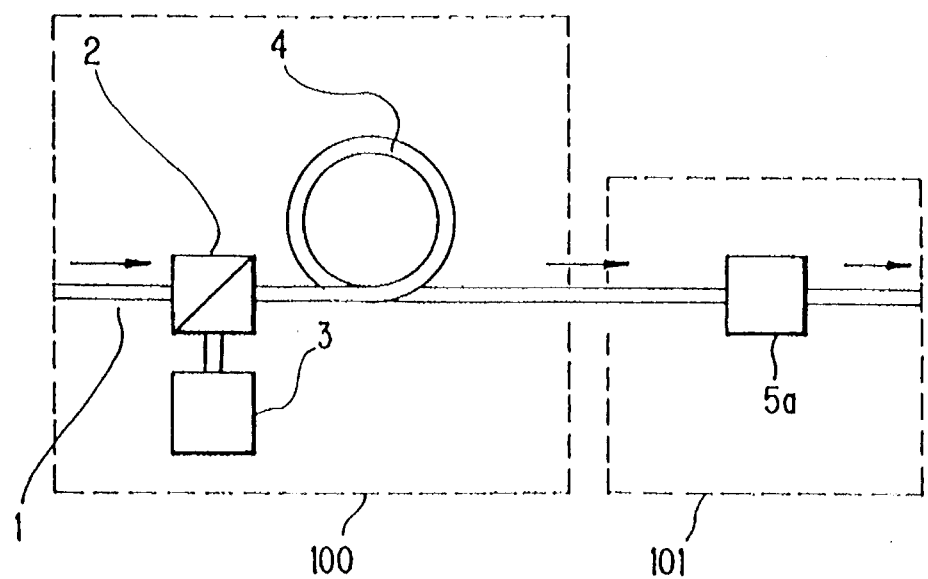
FIG. 1 is a block diagram showing an optical amplification system of a first preferred embodiment according to the invention.

An optical amplification system in the first preferred embodiment according to the invention will be explained in FIG. 1.

The optical amplification system comprises an optical amplification unit 100 for amplifying a WDM (Wavelength Division Multiplexing) signal light of a predetermined polarization having four wavelengths of $\lambda_1(=1.53\ \mu m)$, $\lambda_2(=1.54\ \mu m)$, $\lambda_3(=1.55\ \mu m)$ and $\lambda_4(=1.56\ \mu m)$ to provide an amplified signal light, and an ASE (Amplified Spontaneous Emission) light removal unit 101 for removing a noise component in the amplified WDM signal light to provide an output signal light.

The optical amplification unit 100 comprises a pump light source 3 for emitting a pump light having a wavelength of 0.98 μm, a WDM (Wavelength Division Multiplexing) coupler 2 for coupling the WDM signal light and the pump light to provide a coupled light, and an Er(erbium)-doped optical fiber 4 for amplifying the WDM signal light in the coupled light by absorbing the pump light to provide the amplified WDM signal light.

Figure 2:
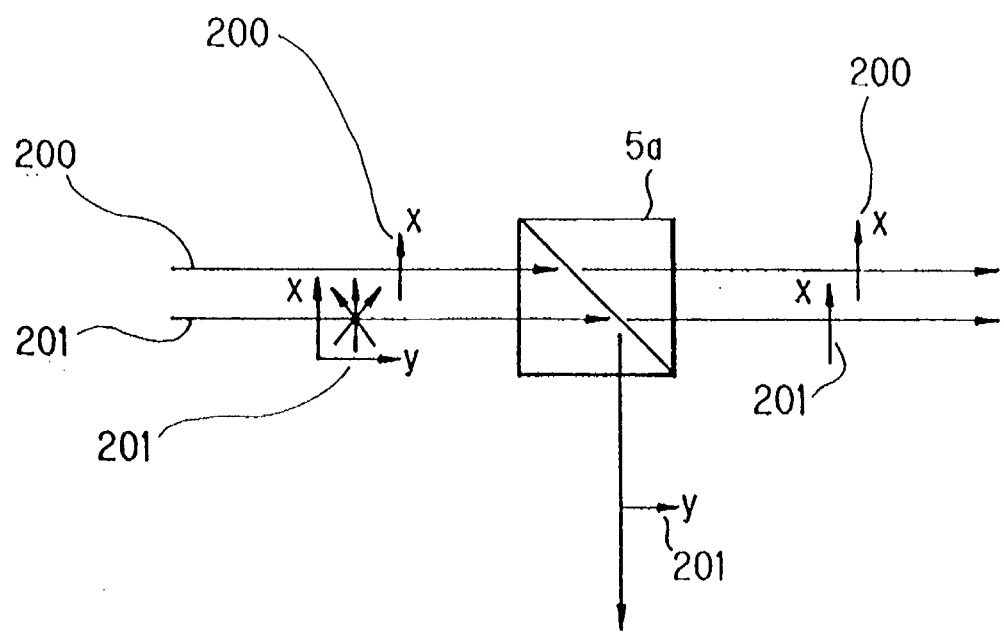
FIG. 2 is a block diagram showing a removing device included in the optical amplification system of the first preferred embodiment according to the invention.

The ASE light removal unit 101 comprises a PBS (polarization beam splitter) 5a shown in FIG. 2 for removing the ASE light having a polarization component among arbitrary polarizations.

In the optical amplification unit 100, for example, the pump light souse 2 has a 0.98 μm wavelength LD which has an active layer consisting of an InGaAs/AlGaAs strained double-quantum well (SDOW) layer, and the Er-doped optical fiber 4 has an Er concentration of 80 ppm, a mode-field diameter of 6 μm, and a length of 60 m.

Figure 3A:
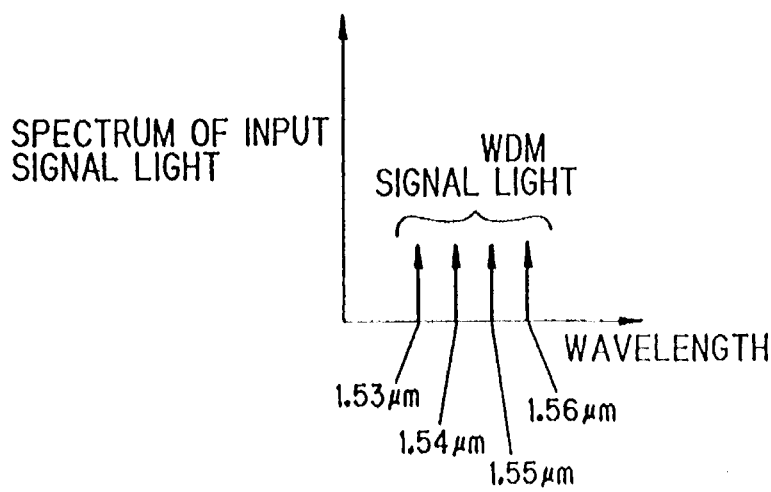
FIGS. 3A to 3C are explanatory diagrams showing operation of the optical amplification system of the first preferred embodiment according to the invention.

In operation, the WDM signal light 200 having four wavelengths $\lambda_1$ to $\lambda_4$ of a common linear polarization as shown in FIG. 3A is supplied from a DFB-LD (not shown) to the WDM coupler 2 to be coupled with the pump light supplied from the pump light source 3. A light thus coupled is supplied to the Er-doped optical fiber 4.

At the Er-doped fiber 4, the pump light is absorbed therein so that the WDM signal light 200 is amplified thereby. After that, the amplified WDM signal light 200 is supplied to the ASE light removal unit 101.

Figure 3B:
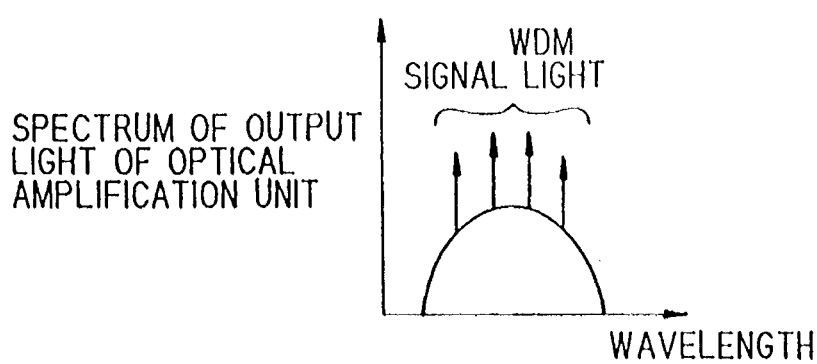

The WDM signal light 200 is amplified as described above, while the ASE light 201 having arbitrary polarizations is generated in the Er-doped optical fiber 4. FIG. 3B shows a spectrum of an output light of the optical amplification unit 100. As shown in FIG. 3B, the ASE light 201 is indicated to be semi-circular along with the amplified WDM signal light 200. Thus, the ASE light 201 will be a noise of the output light supplied from the optical amplification system.

Next, the amplified WDM light 200 is supplied to the PBS 5a. As shown in FIG. 2, in the PBS 5a, the WDM signal light 200 having the linear polarization of X axis is transmitted therethrough without being absorbed therein, while the ASE light 201 having the arbitrary polarizations is transmitted therethrough for the X axis component, and is reflected in the orthogonal direction to the light propagation direction for the Y axis component.

Figure 3C:
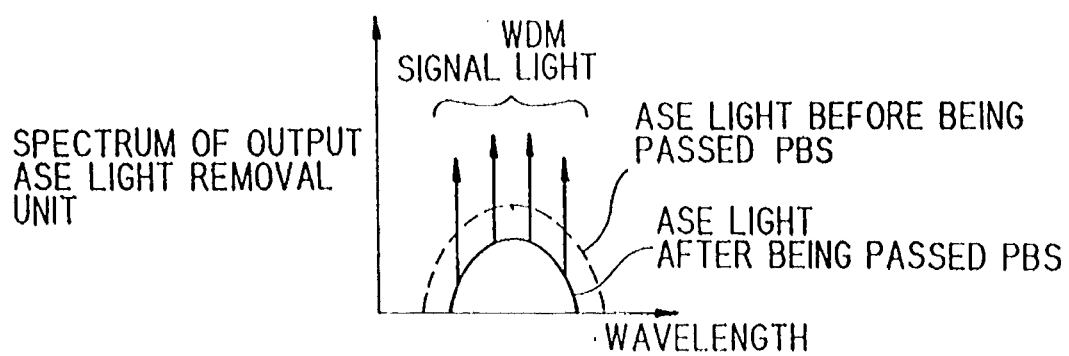

FIG. 3C shows a spectrum of the output light of the ASE light removal unit 101 (PBS 5a). In FIG. 3 C, a dotted line is for the ASE light 201 before being passed through the PBS 5a and a solid line is for the ASE light 201 after being passed through the PBS 5a.

As shown in FIG. 3C, the optical amplification system of the first preferred embodiment has the PBS 5a, so that the ASE light 201 in a WDM signal light band can be reduced approximately by a half. Consequently, the optical amplification system having a low noise characteristic is obtained.

Generally, a transmission signal light of an optical transmitter in an optical communication system is obtained by modulating an injection current of a semiconductor laser, or an output light of the semiconductor laser using a intensity optical modulator such as a $LiNbO_3$ optical modulator. An output signal light of this optical transmitter is maintained with a constant linear polarization state, so that the optical amplification system of the first preferred embodiment is connected to an output of the optical transmitter. When the optical amplification system of the first preferred embodiment is actually used as a booster amplifier for transmitting an output signal of a high power, a good characteristic is obtained.

In the first preferred embodiment, the ASE light removal unit 101 adopts the PBS 5a as a first example. The PBS 5a may be replaced as a second example by a lami-pole device (Trademark) 5b as explained in the Japanese Patent No. 1351184, and as also shown in FIG. 4.

In FIG. 4, the lami-pole device is composed of metal layers 300 and dielectric layer 301 alternately stacked, so that the WDM signal light 200 of the X-axis polarization is passed therethrough, while the ASE light 201 of the arbitrary polarizations is absorbed therein, thereby resulting in the transmission of the WDM signal light 200.

Figure 5A:
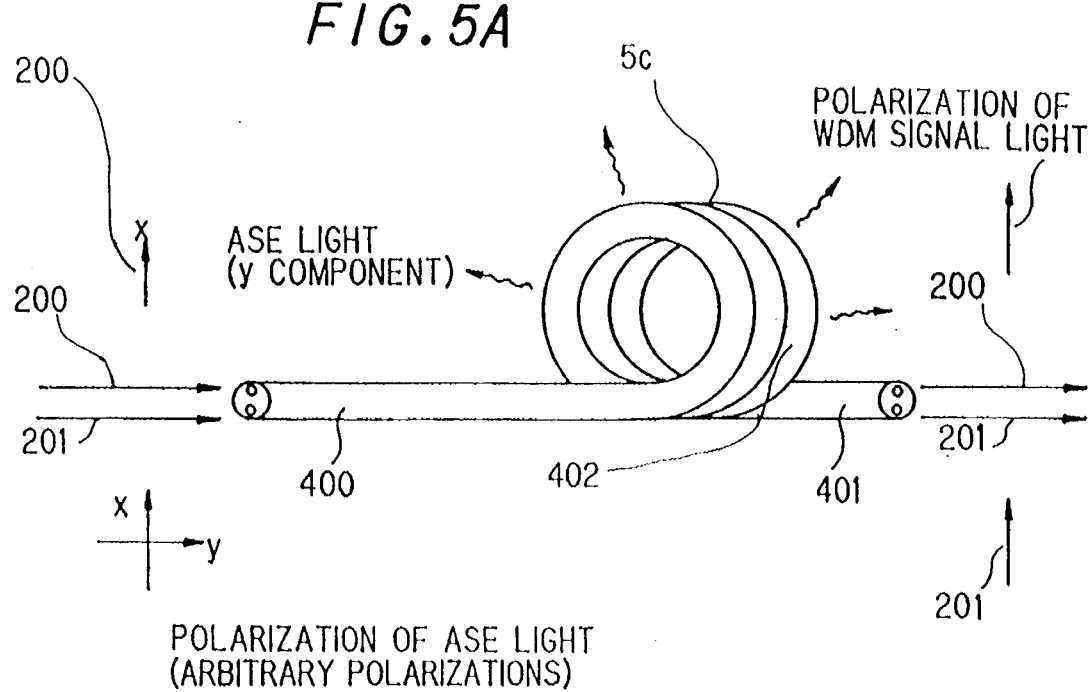
FIGS. 5A and 5B are schematic perspective and cross sectional view showing a still further removing device used in the first preferred embodiment.
Figure 5B:
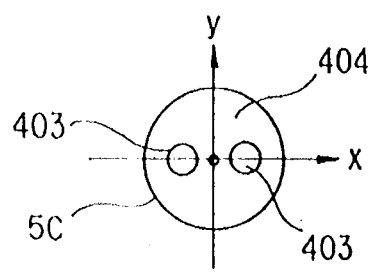
Figure 5C:
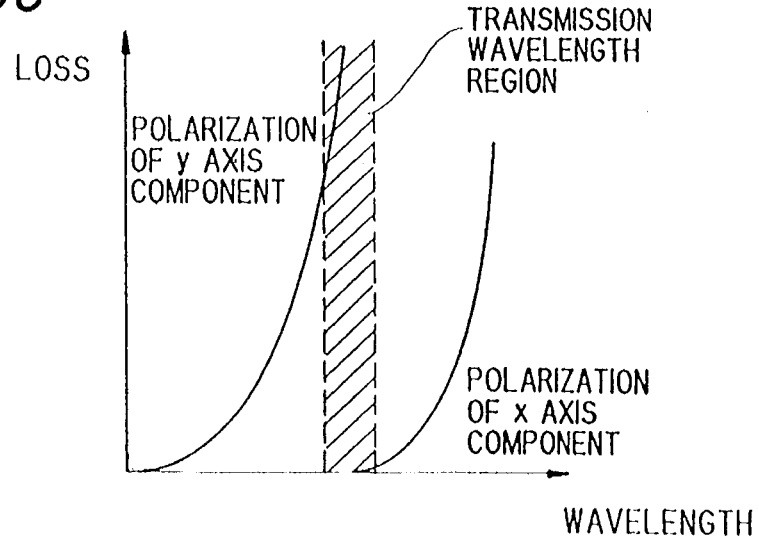
FIG. 5C is a graph explaining a loss relative to a wavelength for the removing device in FIG. 5A and FIG. 5B.

Further, the PBS 5a may be replaced as a third example by an optical polarizer 5c. The optical polarizer 5c is shown in FIGS. 5A to 5C. The optical polarizer 5c comprises an input portion 400, a coiled portion 402, and an output portion 401 as shown in FIG. 5A, such that it comprises a pair of cores 403 arranged in the direction of a polarization to be transmitted therethrough and a cladding layer 404 for covering the cores 403 in a transverse cross section thereof, as shown in FIG. 5B. The optical polarizer 5c has a property as shown in FIG. 5C, wherein a loss represented along Y axis relative to a wavelength represented along X axis indicates that lights of wavelengths $W_1$ to $W_2$ having the X axis polarization are passed through the coiled portion 402, while lights of less than the wavelength $W_1$ having the Y axis polarization and of more than the wavelength $W_2$ having the X axis polarization are prohibited from the transmission.

In operation, a WDM signal light 200 of the wavelength range $W_1$ to $W_2$ having the X axis polarization is supplied to the input portion 400 of the polarizer 5c along with the ASE light 201, so that the WDM signal light and the X axis polarization component of the ASE light 201 are transmitted through the coiled portion 402, while the Y axis component of the ASE light 201 is prohibited from the transmission through the coiled portion 402 to be partially radiated from the outer surface thereof. Consequently, the WDM signal light 200 is obtained at the output portion 401.

Figure 6:
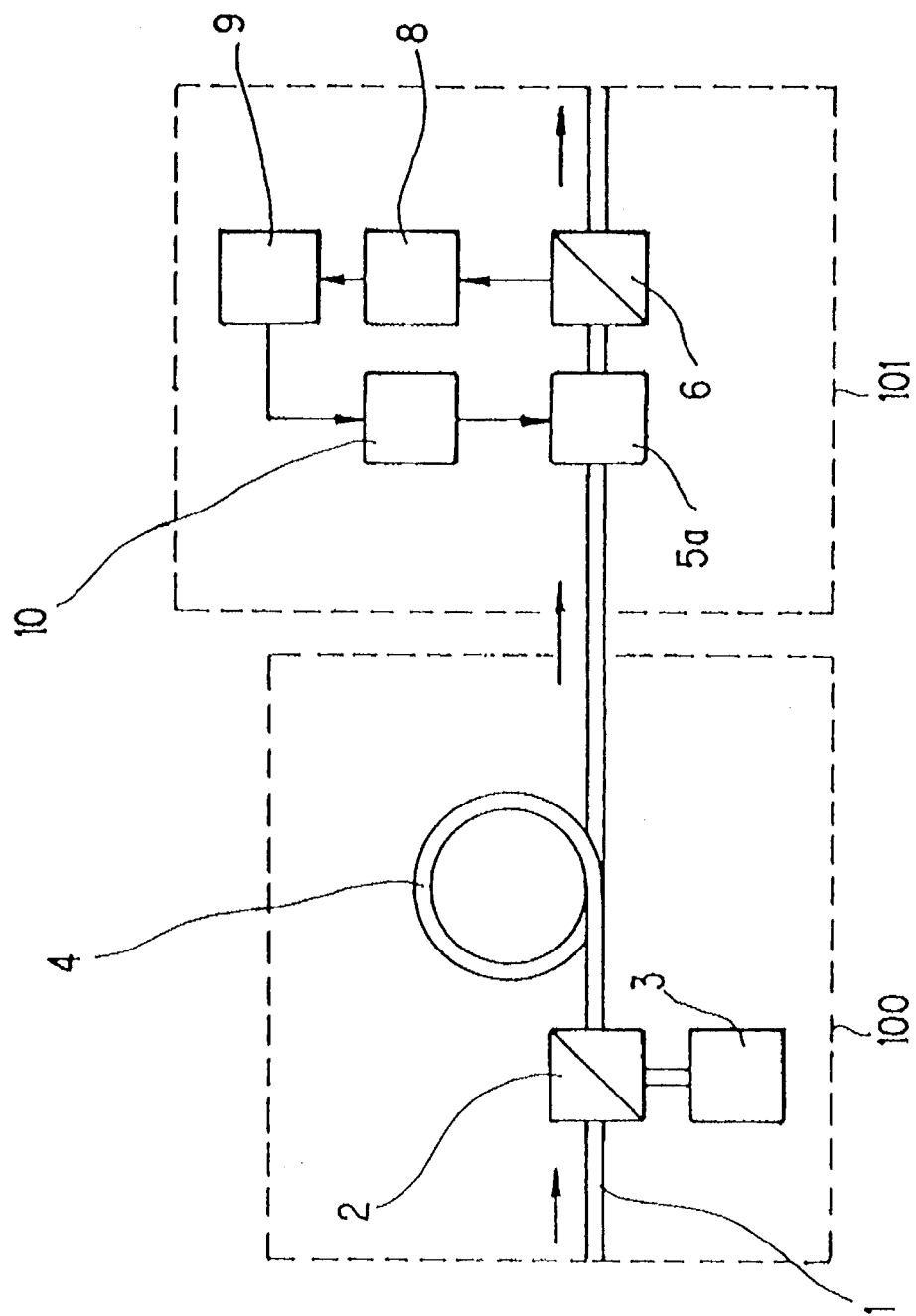
FIG. 6 is a block diagram showing an optical amplification system of a second preferred embodiment according to the invention.

Next the optical amplification system in the second preferred embodiment according to the invention will be explained in FIG. 6, wherein like parts are indicated by like reference numerals.

The ASE light removal unit 100 comprises the aforementioned PBS 5a which can be rotated along the light propagation axis, a branch coupler 6 having two output ports for branching the WDM signal light 200 by two, an optical detector 8 for converting a branched one of the WDM signal light 200 into an electric signal, a control circuit 9 for generating a control signal for the rotation of the PBS 5a, and a driving circuit 10 for rotating the PBS 5a in accordance with the control signal.

In operation, the amplified WDM signal light 200 having a polarization is supplied to the PBS 5a which is controlled to be coincident with the polarization of the WDM signal light 200. At the PBS 5a, the WDM signal light 200 is transmitted therethrough, and the ASE light 201 is reflected in the orthogonal direction to the light propagation direction for the polarization component orthogonal to the polarization of the WDM signal light 200 as explained in the first preferred embodiment shown in FIG. 2.

The WDM signal light 200 is supplied to the branch coupler 6 to be branched by two. One of the branched lights is supplied to the optical detector 8 and the other one is supplied to a next stage as the output signal light.

At the optical detector 8, the WDM signal light 200 is converted into an electric signal to be supplied to the control circuit 9.

At the control circuit 9, a voltage of the electric signal is judged whether it is a predetermined maximum voltage or not. If the voltage is maximum, a transmission rate of the PBS 5a is maximum, namely, the PBS 5a is well controlled in polarization plane to pass the WDM signal light 200.

When the voltage is not the maximum value, the control signal is supplied from the control circuit 9 to the driving circuit 10. In accordance with the control signal, the PBS 5a is rotated with the driving circuit 10 until the voltage becomes maximum. Namely, the PBS 5a is adopted in polarization plane to the WDM signal light 200.

As described above, in the optical amplification system of the second preferred embodiment, the ASE light 201 having arbitrary polarizations is removed by using the PBS 5a, so that the ASE light 201 in a WDM signal light band can be reduced approximately by a half. Consequently, the optical amplification system having low noise characteristics is obtained.

In the second preferred embodiment, the PBS 5a is rotated, so that the WDM signal light 200 may have any linear polarization. If the polarization of the WDM signal light 200 is elliptical or circular, however, a loss for the WDM signal light 200 occurs in the PBS 5a. Especially, if it is circular, the loss becomes maximum in such an extent that the ASE light 201 is removed. Even in such a case, however, a signal to noise ratio is not lowered as compared to that in the case where there is no provision of the ASE light removal unit 101. Actually, a polarization of a signal light is changed under the transmission via an optical fiber which is subject to external disturbance, etc. In fact, however, there is a low probability that a linear polarization is changed to a circular polarization for a signal light transmitting via an optical fiber. For this reason, the optical amplification system in the second preferred embodiment is effective even for a signal light which has been transmitted via an optical fiber.

In the second preferred embodiment, the PBS 5a may be replaced by the lami-pole device 5b or optical polarizer 5c in the same manner as in the first preferred embodiment.

Figure 7:
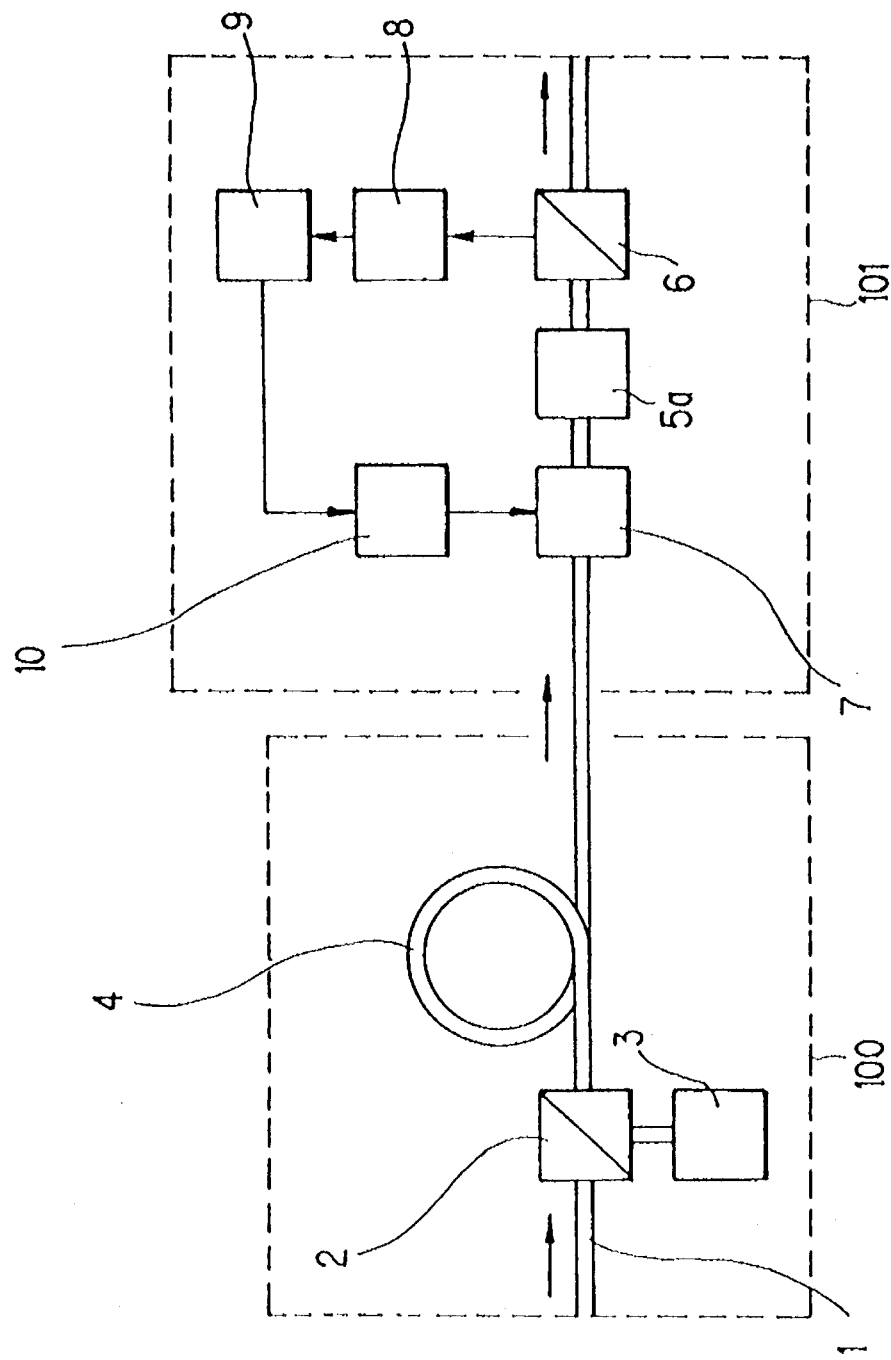
FIG. 7 is a block diagram showing an optical amplification system of a third preferred embodiment according to the invention.

The optical amplification system in the third preferred embodiment according to the invention will be explained in FIG. 7, wherein like parts are indicated by like reference numerals.

The ASE light removal unit 101 comprises the aforementioned PBS 5a, branch coupler 6, and optical detector 8, and a polarization controller 7 for controlling the polarization of the amplified WDM signal light 200 to be pass through the PBS 5a, a control circuit 9 for controlling the polarization controller 7, and a driving circuit 10 for driving the polarization controller 7 to be rotated.

The polarization controller 7 is of fiber squeezers, which individual fiber squeezers squeeze the fiber alternately at 0° and 45° to the vertical, causing a relative phase shift between two orthogonal eigenmodes, as described in pages 1217 to 1224 of "IEEE JOURNAL OF LIGHTWAVE TECHNOLOGY, VOL. 9, NO. 10, OCTOBER 1991".

In operation, the amplified WDM signal light 200 having an arbitrary polarization is supplied to the polarization controller 7. At the polarization controller 7, the polarization of the WDM signal light 200 is tuned to a predetermined polarization of, for instance, X-axis polarization which can pass through the PBS 5a.

The WDM signal light 200 is supplied to the PBS 5a. At the PBS 5, the WDM signal light 200 is transmitted therethrough, and the ASE light 201 is reflected in the orthogonal direction to the light propagation direction for the Y axis component as explained in the first preferred embodiment shown in FIG. 2.

The WDM signal light 200 is supplied to the branch coupler 6 and branched by two in the branch coupler 6. The branched one is supplied to the optical detector 8 and the other one is supplied to a next stage as the output signal light.

When the WDM signal light 200 is supplied to the optical detector 8, the WDM signal light 200 is converted into an electric signal to be supplied to the control circuit 9.

At the control circuit 9, a voltage of the electric signal is judged whether it is a predetermined maximum voltage or not. If the voltage is maximum, a transmission rate of the PBS 5a is maximum, namely, the polarization controller 7 is well controlled in polarization plane to pass the WDM signal light 200.

When the voltage is not the maximum value, the control signal is supplied from the control circuit 9 to the driving circuit 10. In accordance with the control signal, the polarization controller 7 (that is, the fiber squeezers) is rotated to make the voltage maximum, so that the polarization plane of the WDM signal light 200 is coincident with that of the PBS 5a.

As described above, in the optical amplification system of the third preferred embodiment, the ASE light 201 having arbitrary polarizations is removed by using the PBS 5a, so that the ASE light 201 in a WDM signal light band can be reduced approximately by a half. Consequently, the optical amplification system having low noise characteristics is obtained.

In the third preferred embodiment, the polarization controller 7 is included therein, so that the WDM signal light 200 may have any linear polarization. Namely, any arbitrary polarization of the WDM signal light 200 can be changed to the predetermined linear polarization, so that the optical amplification system can be adopted to the WDM signal light 200 having the arbitrary polarization state.

Further, in the third preferred embodiment, the polarization of the input signal light is changed to the predetermined polarization which can be passed through the PBS 5a by the polarization controller 7, so that a polarization dispersion of the optical fiber is compensated, and parts used therein are reduced in number.

In the third preferred embodiment, the PBS 5a may be replaced by the lami-pole device 5b or optical polarizer 5c in the same manner as in the first preferred embodiment. If the polarization controller 7 is positioned before the PBS 5a, the polarization controller 7 may be positioned, for example, in front of the WDM coupler 2 or at the inside of the optical amplification unit 100. The polarization controller 7 may be of a type using a wavelength plate etc. instead of the fiber squeezers.

In the first to third preferred embodiment, a rare-earth element doped optical fiber may be replaced by a semiconductor optical amplifier or a Raman amplifier. As a material doped in an optical fiber for amplifying the WDM signal light 200, Erbium may be replaced by the other rare-earth element. In that case, however, a predetermined wavelength of signal light has to be selected in using the other rare-earth element. For example, in case of a Pr(praseodymium)-doped optical amplification unit, the wavelength of signal light is 1.3 µm. A wavelength of the pump light for exciting the Er-doped fiber 4 may be of 1.48 µm etc. instead of 0.98 µm. A excitation method may be of a forward excitation, a backward excitation or both excitations.

For removing the ASE light 201 outside the band of the WDM signal light 200, a band pass optical filter may be used to be connected to an output of the Er-doped optical fiber 4, and the band thereof must be larger than a band of the signal light, for example, 0.5 nm, 1.0 nm or 3 nm.

For stabilizing the operation of the optical amplification unit 100, an optical isolator of polarization independent type can be used either in front of the Er-doped optical fiber 4 or at the back of the Er-doped optical fiber 4. The optical isolator used in the first preferred embodiment is not always the polarization independent type, especially, in case where it is connected to output of the Er-doped optical fiber 4, the PBS 5a may be replaced by the optical isolator of polarization independent type. In the second and third preferred embodiments, in case where the optical isolator is used at the back of the PBS, the optical isolator of polarization dependent may be used thereat. In the third preferred embodiment, the PBS may be replaced by the optical isolator of polarization dependent type. Furthermore, if another polarization controller is used in front of the polarization controller 7 shown in FIG. 7, the optical isolator of polarization dependent type may be used to be connected to an output of the polarization controller 7 shown in FIG. 7.

Although the invention has been described with respect to specific embodiment for complete and clear disclosure, the appended claims are not to be thus limited but are to be construed as embodying all modifications and alternative constructions that may occur to one skilled in the art which fairly fall within the basic teaching here is set forth.

What is claimed is:

1. An optical amplification system, comprising:

an optical amplifier for amplifying an input signal light to provide an amplified signal light, said input signal light being of a predetermined polarization; and means, located after and connected to said optical amplifier, for only transmission of that portion of said amplified signal light at said predetermined polarization, so that only said amplified signal light at said predetermined polarization is transmitted therethrough, while said amplified signal lights of other polarizations the said predetermined polarization is prohibited from being transmitted therethrough.

2. An optical amplification system, comprising:

an optical amplification unit comprising a pump light source for emitting a pump light, a wavelength division multiplexing coupler for coupling a supplied signal light and said pump light to provide a coupled light, a erbium-doped optical fiber for amplifying said signal light by absorbing said pump light to provide an amplified signal light and said signal light being of a predetermined polarization; and an amplified spontaneous emission light removal unit located after and connected to said optical amplification unit and comprising means for removing an amplified spontaneous emission light being of other polarizations than said predetermined polarization.

3. An optical amplification system, according to claim 2, wherein:

said removing means comprises a polarization separation element having a polarization state for passing said predetermined polarization, through which said signal light is passed and said amplified spontaneous emission light is removed thereat.

4. An optical amplification system, according to claim 3, wherein:

said removing means further comprises an branch coupler having two output ports for branching said signal light in which said amplified signal light is divided into first and second signal light;

an optical detector for converting said first signal light into an electric signal;

a control circuit for generating a control signal to control a polarization of said polarization separation element to be tuned to said predetermined polarization of said signal light in accordance with said electric signal;

a driving circuit for driving said polarization separation element in accordance with control of said control circuit, so that said polarization thereof is tuned to said predetermined polarization of said signal light.

5. An optical amplification system, according to claim 3, wherein:

said removing means further comprises a polarization controller for controlling a polarization of said signal light to be said predetermined polarization;

a branch coupler having two output ports for branching the said signal light in which said amplified signal light is divided into first and second signal light;

an optical detector for converting said first signal light into an electric signal;

a control circuit for generating a control signal to control said polarization controller to be tuned to said predetermined polarization of said signal light in accordance with said electric signal;

a driving circuit for driving said polarization controller in accordance with control of said control circuit, so that said polarization thereof is tuned to said predetermined polarization of said signal light.

6. An optical amplification system, according to claim 3, wherein:

said polarization separation element comprises a polarization beam splitter, through which said signal light is passed and said amplified spontaneous emission light is reflected thereat.

7. An optical amplification system, according to claim 3, wherein:

said polarization separation element comprises a lamipole device having metal layers and dielectric layers, through which said signal light is passed and said amplified spontaneous emission light is absorbed thereat.

8. An optical amplification system, according to claim 3, wherein:

said polarization separation element comprises an optical polarizer which comprises an input portion, a coiled portion, an output portion in axis direction, and a pair of cores arranged in a direction of a polarization to be transmitted therethrough and a cladding layer for covering said cores in a transverse cross-section, through which said signal light is passed and said amplified spontaneous emission light is radiated from the outer surface thereof not to be transmitted.

9. An optical amplification system, according to claim 5, wherein:

said polarization controller comprises fiber squeezers for controlling said polarization of said signal light to be passed through said polarization separation elements.

10. An optical amplification system, comprising:

an optical amplifier for amplifying an input signal light to provide an amplified signal light, said input signal light and said amplified signal light being of a predetermined polarization; and an amplified spontaneous emission light removal unit which is located after and connected to said optical amplifier.

11. An optical amplification system according to claim 10, wherein said amplified spontaneous emission light removal unit comprises a means for only transmission of an input light thereto at said predetermined polarization, so that said amplified signal light at said predetermined polarization is transmitted therethrough, while lights from said optical amplifier of other polarizations than said predetermined polarization is prohibited from being transmitted therethrough.

12. An optical amplification system according to claim 5, wherein said polarization controller comprises:

a wavelength plate for controlling said polarization of said signal light to be passed through said polarization separation element.

* * * * *